UNITED STATES PATENT OFFICE.

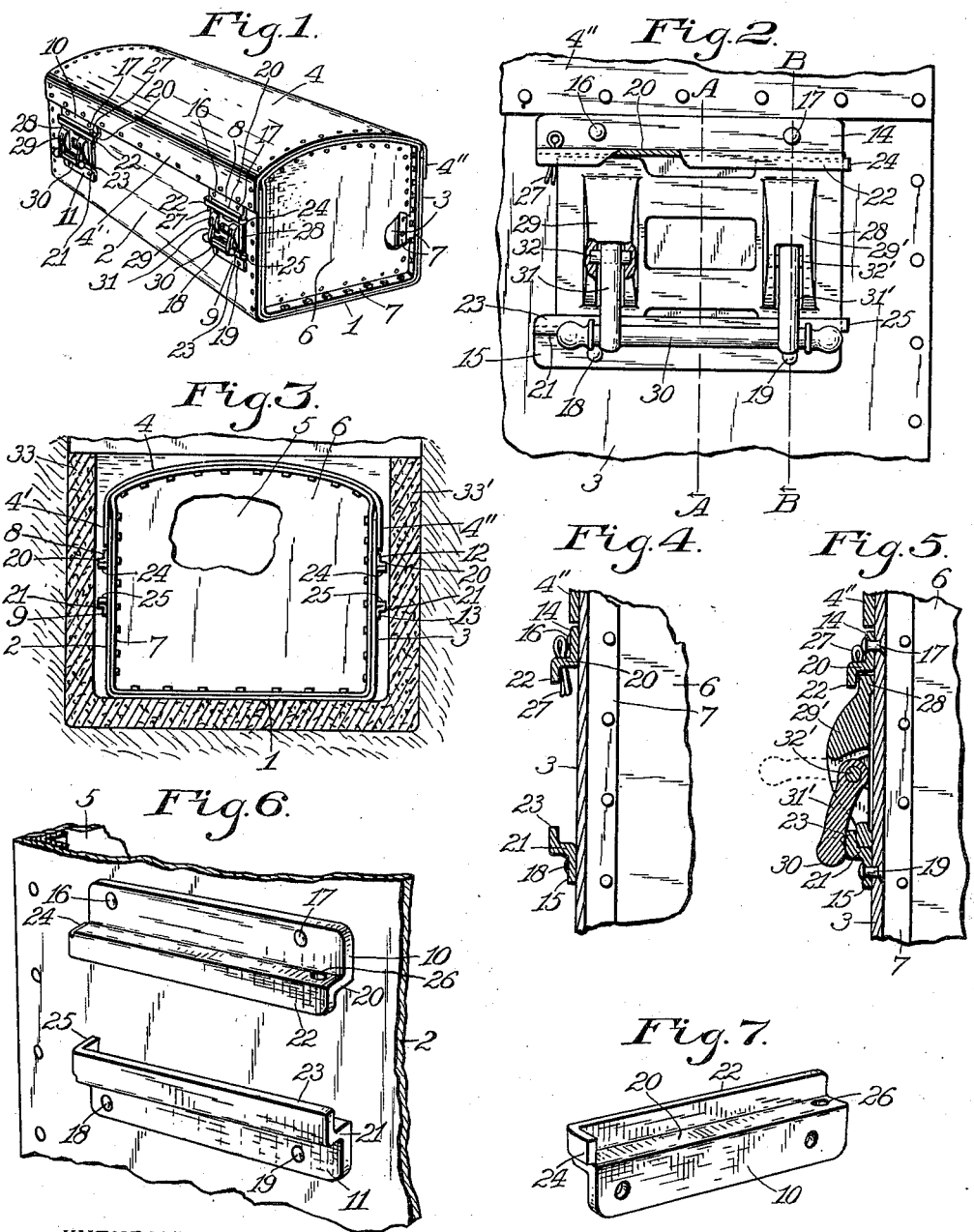

JAMES M. DODDRIDGE, OF MILTON, AND JOHN C. BECK, OF INDIANAPOLIS, INDIANA.

DETACHABLE CASKET-HANDLE.

1,030,877. Specification of Letters Patent. Patented July 2, 1912.

Application filed August 10, 1911. Serial No. 643,263.

*To all whom it may concern:*

Be it known that we, JAMES M. DODDRIDGE and JOHN C. BECK, citizens of the United States, residing at Milton, county of Wayne, and Indianapolis, in the county of Marion, respectively, and State of Indiana, have invented a new and useful Detachable Casket-Handle, of which the following is a specification, reference being had to the accompanying drawings and to the letters and figures of reference marked thereon.

This invention relates to inclosing casings, especially to caskets commonly used for interment, the invention having reference more particularly to detachable handles therefor.

The object of the invention is to provide a receptacle with removable handles in order that one set of handles may suffice for any number of receptacles and therefore be economical; a further object being to provide a burial casket inclosing casing with handle holders adapted to removably hold the handles, so that when about to lower the casing into the grave the handles may be removed and preserved for future use and not occupy spaces at the sides of the casing, in order that the grave may be made narrower than it is permissible when the handles are permanently connected to the casing.

With the above mentioned, and minor objects in view, the invention consists in an inclosing receptacle having a plurality of pairs of holding devices adapted to removably secure handle frames to the receptacle, the handle frames having suitable handles connected thereto; and the invention consists further in the novel parts and combinations and arrangement of parts hereinafter particularly described and claimed.

Referring to the drawings, Figure 1 is a perspective view of a metallic coffin inclosing casing provided with the improved handle holding devices and handles connected therewith; Fig. 2, a fragmentary side elevation showing the farther end portion of the rearward side of the casing to which the improvement is applied; Fig. 3, a fragmentary transverse section of a grave in which the casing is placed; Fig. 4, a section on the line A A in Fig. 2; Fig. 5, a section on the line B B in Fig. 2; Fig. 6, a fragmentary perspective view showing a portion of one side of the casing and a pair of handle holding devices thereon; and Fig. 7, a perspective view of one of the handle holding devices inverted.

Similar reference characters in the several figures of the drawings indicate like elements or features of construction herein referred to.

The body of the inclosing casing or casket may be composed of any suitable or desired material, and in the present case is illustrated as being composed of sheet metal and comprises a bottom 1, two integral sides 2 and 3, a top 4 having side lips 4' and 4'' secured to the sides, and two ends 5 and 6, one end being adapted to be inserted after a corpse inclosing casket is placed in the casing, and suitably secured to the adjacent portions of the body, the said end preferably being provided with an angle-iron frame 7 adapted to be bolted to the other portions.

The side 2 of the casing is provided near one end thereof with two base plates 8 and 9 and near the opposite end thereof with two base plates 10 and 11, the side 3 being provided near one end thereof with a pair of base plates 12 and 13 and near the opposite end thereof with another pair of base plates 14 and 15, said base plates constituting main portions of the handle holders, and are arranged horizontally one above another and suitably spaced apart. The upper one of each pair of base plates is secured to the casing preferably by means of two rivets 16 and 17, the lower one of the pair being secured by rivets 18 and 19. All the base plates are substantially alike and preferably are composed of either bar or sheet iron. Each upper one of a pair of base plates has a right angle flange 20 thereon, and each lower one has a right angle flange 21 thereon, the flange extending outwardly from the side of the casing, said two flanges having lips 22 and 23 thereon, respectively, that extend each toward the other, opposite the side of the casing. The ends of the devices that are nearest to the ends of the casing are provided with suitable stops which may be formed in any suitable manner, the lip 22 preferably having an integral stop 24 thereon, and the lip 23 having a similar stop 25 thereon, the stops extending inwardly toward the side of the casing and substantially at right angles to the flanges and lips. The end portions of the flanges 20 that are nearest to the middle portion of the side of the casing have each a pin-hole 26 therein in which a cotter 27 is removably placed so as to extend opposite the stop, that is at the opposite end of the flange.

A suitable type of handle frame 28 is employed, which has two housings 29 and 29' thereon, a handle bar 30 provided with arms 31 and 31' preferably being employed, the arms extending into suitable slots in the housings and being provided with pivots 32 and 32' respectively mounted in the housings, so that the arms may hang downward or shall engage the wall of the housings when raised to an approximately horizontal position as indicated in dotted lines in Fig. 5 when it is desired to lift the casing. It is obvious, however, that the handles may be rigidly fixed to the handle frames if desired. It should be understood also that the casing may be provided with as many removable handles as may be desired or required. These handles are to be used not only with coffin inclosures but also with the inclosed coffins.

In practical use the sides of the casing are equipped with the handles as illustrated and each handle frame is inserted between the two flanges 20 and 21 and between the side of the casing and the lips 22 and 23, and against the stops 24 and 25, the frames being secured in place by the cotter 27. The grave may be a mere excavation or it may be provided with masonry or the concrete walls 33 and 33' in the lower portion of the excavation, and as will be understood the tops of the walls are liable to be broken by the handles of the casing when permanently connected thereto; and with the improved casing after it is in place above the grave and ready to be lowered, the cotters 27 are readily withdrawn, after which the handle frames are quickly withdrawn from the holding devices and preserved for future use, the casing then being lowered in the customary manner. When a funeral director or undertaker, who is provided with a set of the handles provides a burial coffin or a casing having the improved handle holders thereon, it is only necessary to apply the handles thereof temporarily, while handling the coffin or the casing in preparation for the funeral and then retain the set of handles for repeated use.

Having thus described the invention, what is claimed as new is—

1. An inclosing casing comprising sides having each a plurality of handle-holders secured thereto, each handle-holder comprising two base plates secured to the side one above the other in parallel order, outwardly extending flanges on the plates, and lips on the flanges extending each toward the other, for removably holding a handle-frame provided with a handle.

2. An inclosing casing comprising sides having each a plurality of handle-holders secured thereto, each handle-holder including two main devices comprising two base plates secured rigidly to the side one above the other in parallel order, each base plate having an outwardly extending flange thereon, each flange having a lip thereon extending toward the lip of the opposite flange, one of said devices being provided with a stop at right angles to the flange and the lip and having a pin-hole in the opposite end portion thereof, for removably holding a handle-frame.

3. In a burial casing, the combination with a body comprising two upright sides, and a plurality of handle-frames having each a handle thereon, of a plurality of pairs of base plates secured rigidly to the sides of the body, the plates of each pair being arranged horizontally in parallel order one above the other, each plate having an outwardly extending flange thereon, one of said flanges having a pin-hole in one end portion thereof, each flange having a lip thereon extending toward the lip of the opposite flange, the flanges and the lips of said pair of plates removably holding one of the handle-frames and provided with stops at the ends opposite the end that has the pin-hole therein, said stops opposing one end of said frame, and a cotter inserted removably in said pin-hole opposite the opposite end of said frame.

In testimony whereof, we affix our signatures in presence of two witnesses.

JAMES M. DODDRIDGE.
JOHN C. BECK.

Witnesses:
  E. T. SILVIUS,
  P. A. HAVELICK.

---

Copies of this patent may be obtained for five cents each, by addressing the "Commissioner of Patents, Washington, D. C."